No. 607,563. Patented July 19, 1898.
W. C. FLÖRING.
WATER LEVEL INDICATOR.
(Application filed Nov. 4, 1895.)
(No Model.) 2 Sheets—Sheet 1.

Fig. 2ᵃ.

WITNESSES:
INVENTOR:
BY HIS ATTORNEY:

No. 607,563.  
W. C. FLÖRING.  
WATER LEVEL INDICATOR  
(Application filed Nov. 4, 1895.)  
Patented July 19, 1898.
(No Model.) 2 Sheets—Sheet 2.
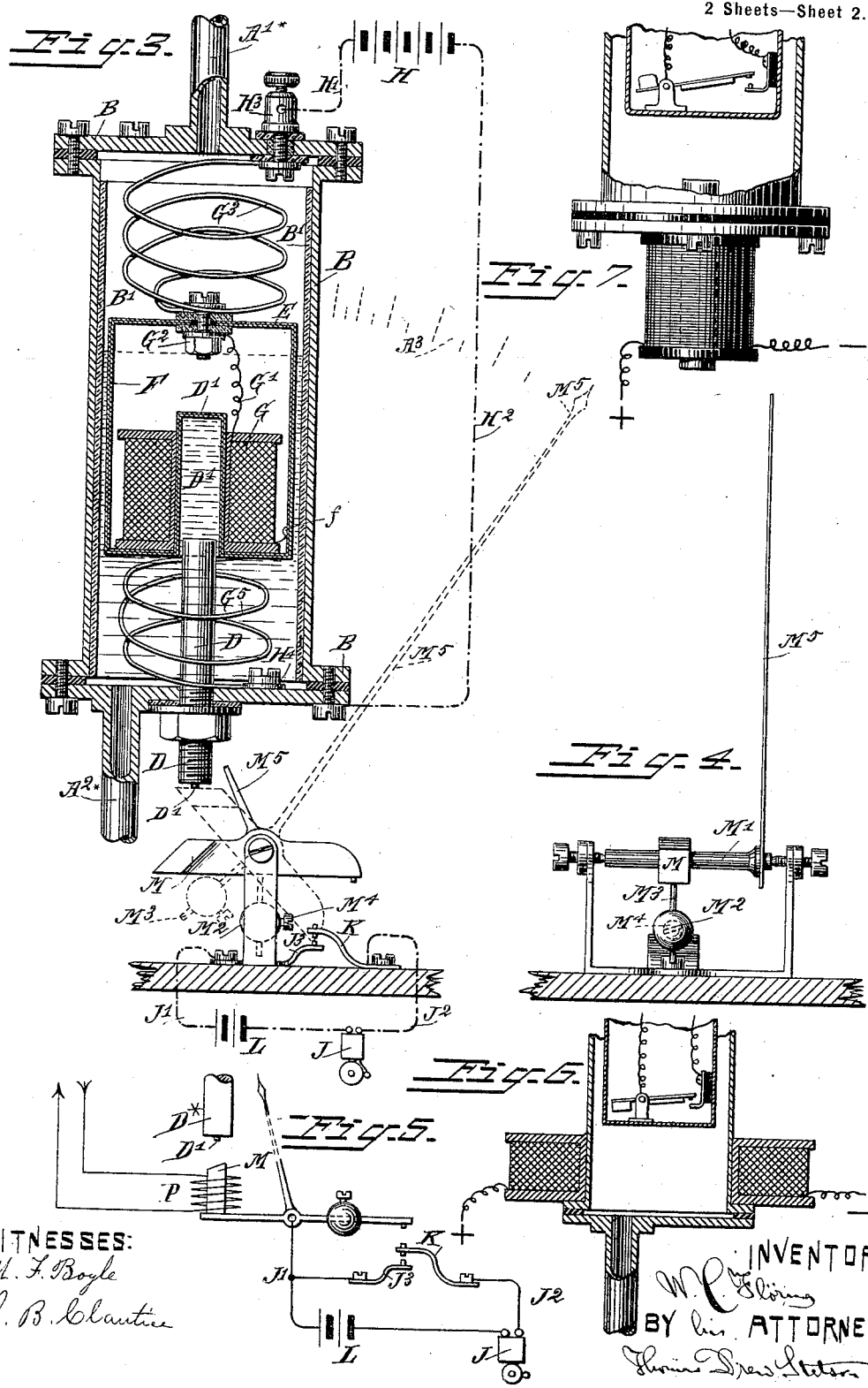

UNITED STATES PATENT OFFICE.

WILLIAM CARL FLÖRING, OF WATERBURY, CONNECTICUT.

WATER-LEVEL INDICATOR.

SPECIFICATION forming part of Letters Patent No. 607,563, dated July 19, 1898.

Application filed November 4, 1895. Serial No. 567,801. (No model.)

*To all whom it may concern:*

Be it known that I, WILLIAM CARL FLÖR-ING, a subject of the Emperor of Germany, residing at Waterbury, New Haven county, in the State of Connecticut, have invented a certain new and useful Improvement in Water-Level Indicators, of which the following is a specification.

My improvement is intended more particularly for steam-boilers, to indicate the fluctuations in the level of the water therein, and I will describe it as thus applied. It belongs to the class which works by the aid of electromagnetism and avoids the necessity of extending any spindle or other connection through the shell of the boiler.

A vessel having two attachments to the boiler—one above and one below the waterline—contains a float supported on the water therein, which is caused by its rising and sinking to vary the magnetic force in an upright bar of iron. The latter extends into the case from below and determines by the variations in its magnetic force the position of an index of sufficient length and range of motion to be visible at a considerable distance, as across an engine-room. There have been many previous efforts in this direction. I have devised important improvements in the details.

The accompanying drawings form a part of this specification and represent what I consider the best means of carrying out the invention.

Figure 1:
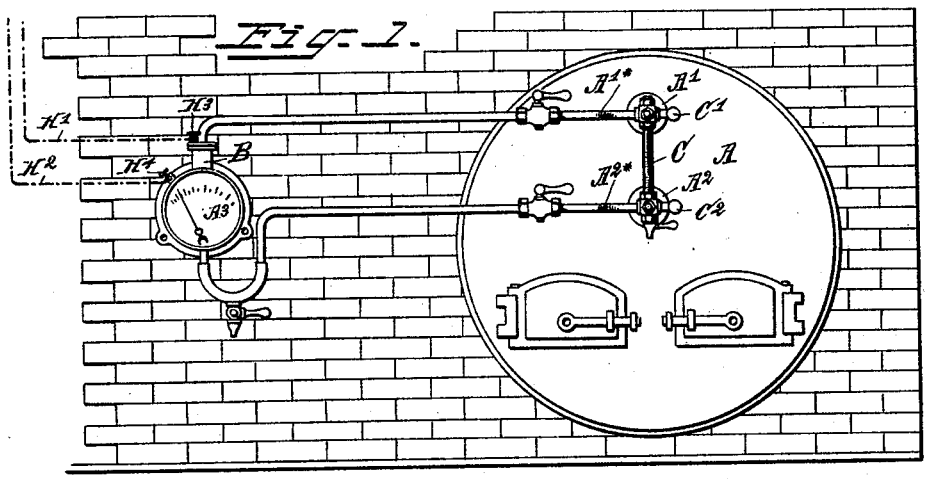
Figure 2:
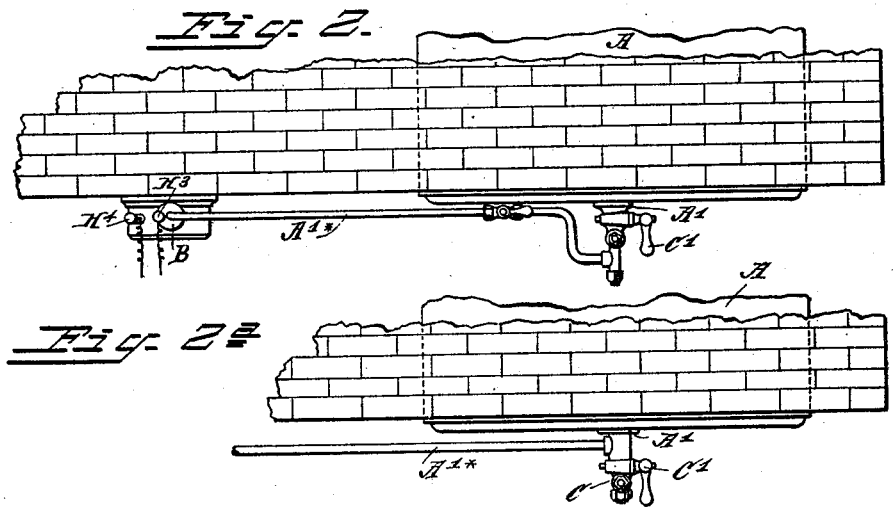
Figure 3:
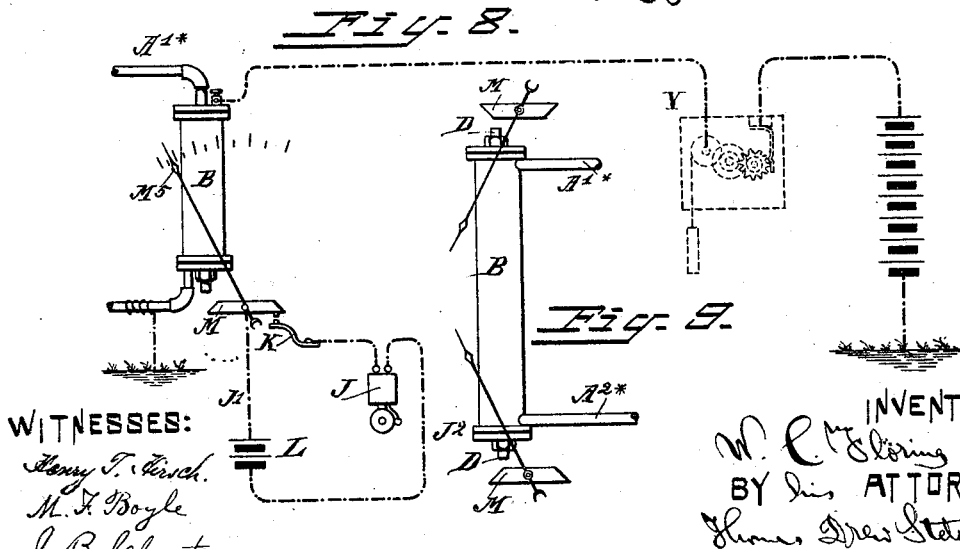

Figure 1 is a general front view of a boiler with my invention applied. Fig. 2 is a plan view of the front portion thereof. Fig. 2ª is a plan view similar to Fig. 2, showing a modification. Fig. 3 is a vertical section of a portion on a larger scale. Fig. 4 is a side elevation of the lower working part of Fig. 3. Fig. 5 is a diagrammatic view. Fig. 6 is a sectional view showing a modification. Fig. 7 is a sectional view, partly in full, showing another modification. Fig. 8 is an outline showing means for making the action intermittent to economize the battery; and Fig. 9 shows a portion with the apparatus duplicated, the upper one being inverted.

Similar letters of reference indicate corresponding parts in all the figures where they appear.

A is the shell of the boiler, and $A'$ $A^2$ flanged attachments which surround each a suitable perforation in the shell and form, respectively, supports for the upper and lower ends of a glass gage C, which latter performs its usual functions of indicating to the eye, on careful inspection, the level of the water in the boiler.

$A'\#$ is a pipe which leads away to one side from the casting $A'$. This pipe contains only dry steam. $A^2\#$ is a corresponding pipe leading in the same direction from the lower casting $A^2$. This should always stand full of water, and I make a trap or bend at one point, as indicated.

B is the main exterior case of my apparatus, in the form of an upright cylinder. It is lined with glass $B'$ or other suitable insulating material. The above-named pipes connect to this case near the top and bottom, respectively, and insure that the steam is in free communication with and fills the upper portion and that the water is in free communication with the lower portion. A vertical rod or bar of soft iron D serves the important end of becoming a variable magnet as the water rises and sinks. This bar extends up in the center of my casing B and extends also downward from the bottom thereof outside of the casing and ready to act by its lower end on a properly-mounted armature.

E is a float formed of a hollow cylindrical shell of copper of a size adapted to move up and down easily in the interior of the casing B. Its upper end is a simple disk, or it may be slightly domed. The lower end is an annular disk. $D'$ is an internal casing of less diameter and length, with the upper end closed. It is fitted tightly by brazing, soldering, or otherwise to the bottom and forms a cavity in its center, which extends from the bottom up some two-thirds of the height of the float. The cavity thus formed is a little larger than the bar D, and as the float rises and sinks with the variations in the height of the water it embraces a greater or less length of the bar D therein.

The float is made of two separate vessels, one placed in the inside of the other. The inside shell is marked F. This inside float insures that if in the course of years water should get inside of the outer shell of the float the vessel concealed therein, not being subject to the same pressure, will remain tight and will keep the dampness out.

Wires H' H² lead from a battery H, which may be of moderate power, arranged to induce a current through these wires and through any parts connected.

G is a spool of properly-insulated wire lying in the annular space in the lower portion of the float. This spool is in electrical communication with suitable binder-screws H³ H⁴ on the upper and lower ends, respectively, of my casing. The upper end of the spool G is connected by a wire G' with a binder G² in the top of the float, the latter being connected by a long and flexible spiral wire G³ with a binder H³ in the top of the casing B. The lower end of the spool G is soldered to the inside of the float at $f$, and the metal of the float connects, by a flexible wire G⁵, with a binder H⁴ in the bottom of my casing B.

It will be seen that the conditions are complete for magnetizing the iron bar D when the water is low in the boiler. The continuous flow of the current through the spool will magnetize the upper end of the bar D whenever the latter is received within the coil; but as the water-level in the boiler rises and sustains the float E higher it raises the spool G, while the bar D remains stationary. As the water-level in the boiler rises and sinks the raising and lowering of the spool develops corresponding changes in the strength of the electromagnet D by reason of the difference in the position of the spool relatively thereto, although the electric current through the spool may remain constant.

M is an armature mounted on an easily-turning axis M', Fig. 4, supported in suitable bearings and carrying a weight M², which may be adjusted up and down on an arm M³ and held in place by a pinching-screw M⁴. A long light index M⁵ is fixed on this shaft and traverses in front of a graduated arc A³, (shown in Fig. 3 in dotted lines,) supported on the fixed framing. One end of the armature M is within the influence of the electromagnet D, and the variations in the magnetism in this bar induce corresponding changes in position of the index M⁵ and indicate very clearly the level of the water.

I connect my pipes A'⅜ and A²⅞ to the castings A' and A² outside of the cocks C' C², so that the cocks may shut off my device from the boiler at any time for examination, adjustment, or repairs without lowering the pressure in the boiler, simply closing the cocks C' C² and dispensing with the use of the gage C for the brief periods during which such condition obtains.

I provide for giving a vigorous alarm by a sounding-bell J if the water-level goes below a certain line. When by reason of want of water in the boiler the spool G is lowered so as to embrace so much of the upper end of the bar D as to make it a sufficiently powerful magnet to deflect the armature M beyond a certain point, one end of the armature will press on a spring K, connected by the conductor J² with one pole of a battery L, (see Fig. 3,) and the armature M and its adjuncts being connected by the conductor J' with the other pole through an alarm-bell J, equipped in the ordinary manner, rings an alarm. The spring K, after yielding a little, makes electrical contact with a branch wire conductor J³, which may have ordinary provisions (not shown) for adjusting its position. The wire J³ being connected with the wire J' serves as an additional passage for the current, completing the circuit when the water-level in the boiler is becoming too low, and may be very important in case dust or other accidental cause shall make a more or less complete insulation between M and K. When the contact is made through either K M or K J³, it completes a circuit through the wires J' and J² from the battery L and the bell J, inclosed in this circuit, is vigorously sounded.

There are difficulties in making and maintaining an insulating-coating of the wire G³. The bath of steam in which it is immersed attacks and renders short-lived some of the ordinary modes of insulating, and others which might withstand such action are objectionable through their prevention of the proper elastic yielding. I employ a wire of hard brass or other good conductor which is sufficiently elastic and leave it in its natural uncoated condition. The glass lining B' of my casing B serves as a sufficient insulator. In most cases the wire G³, properly coiled and located, will serve a long time without making a contact with the interior of the casing; but when through any chance such contact occurs the insulating-lining B' guards against its inducing any serious difficulty.

Modifications may be made without departing from the principle or sacrificing the advantages of the invention.

I can use a deeper casing B and a deeper float E with a tube extending quite through the latter from bottom to top and have two bars corresponding to D, one extending up from below, like the bar D in Figs. 3 and 7, and another extending down from above, the latter being magnetized when the water is too high and provided with an index arranged to swing in an arc below. Fig. 9 shows such a modification. I can modify the effect of the changes in the magnetism by providing either a permanent or an electro magnet in place of the armature M or by employing an additional coil arranged to induce in an armature the opposite polarization to that in the bar D. Fig. 5 shows this latter construction. In this figure, D* represents the extreme lower end of the bar D, and the provisions for effecting its magnetic condition by the rise and fall of the water-level may be as in Fig. 3. The additional coil P, subject to a constant current, which may be the same current as flows through the spool G, induces magnetism in a soft-iron bar which is presented to the bar D and is moved by the changes in the magnetism of the latter. The balancing of this additional electromagnet and the adjusting of the balance and the provisions for making and breaking another circuit and ringing the bell by the movement of this magnet are all very clearly shown in the figures.

The simple arrangement shown in Fig. 3, which is for general use preferred, may be reversed. Fig. 7 shows such a modification. In this the spool is stationary, and an armature is carried on the float. When the water sinks, the armature is brought down farther within the coil, and the increased magnetism of the armature effects the closing of the additional circuit and the ringing of the alarm. The apparatus will work nearly the same if the current is sent at intervals through the spool.

Parts of the invention can be used without the whole. I can make the pipes A'⚹ and A²⚹ connect to the castings A' and A² between the boiler and the ordinary cocks which are fitted in those castings. Such is shown in Fig. 2ª. Such arrangement will insure that my apparatus will work under all circumstances. If, for example, the glass tube C breaks and we shut the ordinary cocks C' C² to prevent the escape of steam and water through the break thus made, my apparatus will remain in connection with the interior of the boiler and will work independently, as before the breakage of the glass. In such case I can supply additional cocks, if required, to control the access of steam to my apparatus.

I have shown the ordinary slight pin of brass set in the base of the bar D to provide against a complete contact of the armature with the iron. This can be in the armature instead, or it can be omitted entirely in many cases.

It is practicable to economize the materials in the battery by causing the current to flow only a small portion of the time, with long intervals of disuse, during which no current is allowed to flow and there is no consumption of the elements in the battery. In such case the index will return at short intervals to the "nothing" mark and remain of no effect until the period arrives when the current will again flow. This may be controlled automatically by clockwork. Fig. 8 shows such an arrangement, the clock being marked Y. The clock may complete the circuit and allow the current to flow and the index to indicate the level of the water for three seconds, with an intermission of fifty-seven seconds, and then repeat, and so on indefinitely.

The indicating device operated by the armature M may be either visual or audible in character instead of both, as previously set forth.

I claim as my invention—

1. In a water-level indicator, the vessel B provided with a core D, the energized spool G, in direct relation to said core to magnetize the same by establishing a magnetic field within the vessel, a float in said vessel, and boiler-pipe connections, in combination with an electric signaling device, circuit therefor and circuit-closing device, the changing position of the float serving to magnetically operate the circuit-closer by the induction established in the core, substantially as set forth.

2. In a liquid-level indicator, the vessel B provided with a core D, the energized spool in direct relation to said core to magnetize the same by establishing a magnetic field within the vessel, in combination with an electric signaling device arranged to be gradually influenced by a changing position of the float, and with two spiral connections $G^3$ $G^5$ adapted to yield elastically between such float and electric conductors outside and conduct a current through the float in any position thereof, substantially as set forth.

3. In a liquid-level indicator, the combination with the case B of the float E and spool G, carried thereby with its insulated connections, and the bar or core D secured in the end of such case to become excited by the spool and the armature M and index $M^5$, all substantially as herein specified.

4. In a liquid-level indicator, the combination with the case B of the float E and spool G, carried thereby with its insulated connections, bar or core D secured in the end of such case to become excited by the spool, and the armature M and attached index $M^5$, with the contact-pieces K, $J^3$, one of which is moved by such parts when in an extreme position, and an extra circuit controlled thereby, and the alarm device J operated by such extra circuit when the water changes from a predetermined level all arranged for joint operation, substantially as herein specified.

In testimony that I claim the invention above set forth I affix my signature in presence of two witnesses.

WILLIAM CARL FLÖRING.

Witnesses:
M. O. CAMON,
EDWARD STORZ.